United States Patent

Flora

[15] 3,651,502

[45] Mar. 21, 1972

[54] MAGNETIC SENSING TRANSDUCER WITH A FLAT UNITARY LAMINATE CORE STRUCTURE

[72] Inventor: James D. Flora, North Hollywood, Calif.

[73] Assignee: The Singer Company

[22] Filed: June 15, 1970

[21] Appl. No.: 46,356

[52] U.S. Cl. ....................340/174.1 F, 179/100.2 CF

[51] Int. Cl. ....................G11b 5/16, G11b 5/22

[58] Field of Search ....................179/100.2 C, 100.2 CF; 340/174.1 F, 174.1 G, 174.1 H; 346/74 M, 74 MC

[56] References Cited

UNITED STATES PATENTS

| | | | |
|---|---|---|---|
| 3,399,393 | 8/1968 | Chang | 179/100.2 C |
| 3,487,388 | 12/1969 | Camp | 179/100.2 CF |
| 3,017,617 | 1/1962 | Quade | 179/100.2 CF |
| 3,004,820 | 10/1961 | Howden | 346/74 MC |
| 2,933,721 | 4/1960 | Hagopian | 179/100.2 CF |

*Primary Examiner*—Bernard Konick
*Assistant Examiner*—Alfred H. Eddleman
*Attorney*—Linval B. Castle

[57] ABSTRACT

A magnetic transducer capable of sensing binary digital data as represented by the polarity of a magnetic dipole recorded either vertically or horizontally on a magnetic medium such as barium ferrite, iron oxide, or appropriate thin film magnetic plating. The transducer can determine the polarity of the magnetic dipole on a moving or stationary magnetic medium, and it is suitable for use in high density easily programmed magnetic encoders.

2 Claims, 5 Drawing Figures

INVENTOR.
James D. Flora
By [signature]
ATTORNEYS

MAGNETIC SENSING TRANSDUCER WITH A FLAT UNITARY LAMINATE CORE STRUCTURE

BACKGROUND OF THE INVENTION

Electromagnetic transducer heads in widespread use in the prior art are, for the most part, of a dynamic type which require relative movement between the magnetic medium and the transducer in order for the transducer to be able to sense the magnetic recordings on the medium. Static sense heads are also known to the prior art which rely on a change in magnetic reluctance to produce a corresponding output signal, but such heads are not suited to the high packing densities used in present digital recordings.

The transducer head of the present invention is constructed so that its sensitivity is related to the resultant flux, rather than to a change in reluctance, and is suited for use with vertical or horizontal magnetic dipole binary digital recording whereby high packing densities may be achieved. For example, digital data of the order of 735 bits per inch on the recording medium may be sensed by the head of the invention.

A primary objective of the present invention, therefore, is to provide an improved electromagnetic transducer head in the form of a horizontal or vertical magnetic pole static sense read-write head, and which is capable of reading binary digital data stored either vertically or horizontally on a magnetic medium. As will be described, the electromagnetic sense head of the invention can be constructed to include a monolithic or laminated core structure.

The static electromagnetic sense head of the invention may be used as a magnetic transducer which is capable of storing or retrieving binary digital data from a magnetic medium, the binary data bits being stored, for example, in the form of vertical magnetic dipoles for increased packing density, or in the form of horizontal magnetic dipoles. The electromagnetic transducer head to be described is capable of reading the data bits, for example, at medium/head relative velocities of 0–30 i.p.s., or higher. The amplitude of the signal produced by the electromagnetic sense head of the invention is independent of the relative velocity between the head and the magnetic medium.

The electromagnetic sense head of the invention to be described, for example, does not contain a gap. It may be made from a single lamination, as mentioned above. The structure of the head permits apparatus in which it is incorporated to be constructed at relatively low cost, and it also permits extremely high magnetic packing densities to be used, as also mentioned above.

DETAILED DESCRIPTION OF THE ILLUSTRATED EMBODIMENT

Figure 1:
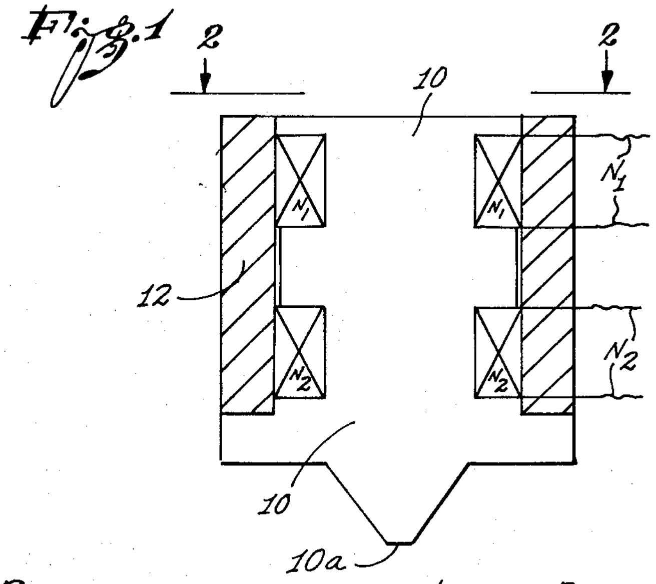
FIG. 1 is a side section of a head constructed in accordance with the invention, showing the head in a somewhat schematic manner.
Figure 2:
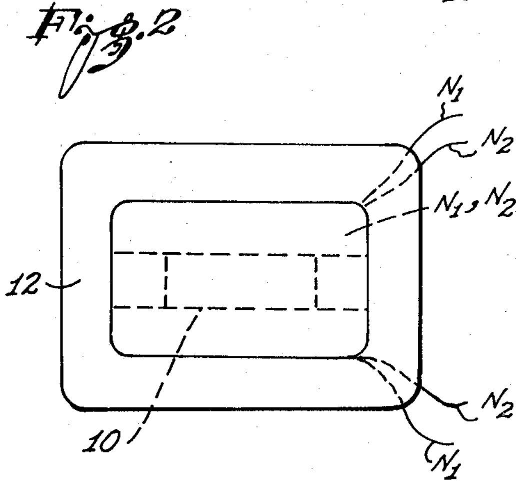
FIG. 2 is a top view of the head of FIG. 1, taken along the line 2—2.

The electromagnetic transducer head illustrated in FIGS. 1 and 2 includes a flat core structure 10 which may be composed, for example, of a single laminate of appropriate magnetic material, such as high nickel alloy, or other appropriate magnetic permeable material. The head 10 is shaped to provide an apex at its lower extremity which is designated 10*a*. This apex senses the magnetic recordings on the associated magnetic medium. As observed, there is no gap in the core structure of the head.

Figure 4:
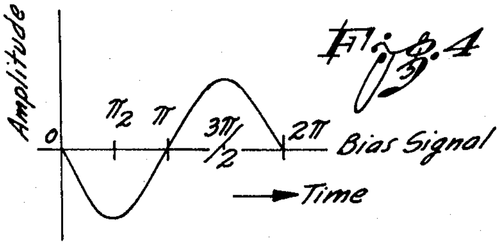
FIG. 4 is a wave form of a drive signal which is applied to one winding of the head.

The core structure 10 of FIG. 1 is configured so as to permit a first winding N1 to be wound around the central part of the core, adjacent the upper end thereof. This first winding N1 is an alternating current drive winding, and a drive, or bias, signal, of a wave form shown, for example, in FIG. 4, is passed through the winding N1 to establish a desired magnetic field within the core structure. This results in a signal $E_0$ being developed across a winding N2. The winding N2 is a "read/write' winding and it also is wound around the core 10, as shown, in a position axially spaced from the drive winding N1.

A magnetic member 12 extends around the core 10 and coil assembly N1 and N2, the latter member being formed of magnetic permeable material so as to provide a return magnetic path for the head. Electrostatic material may also be wrapped around the head, so as to form an electrostatic shield. Appropriate leads, as shown, are connected to the coils N1 and N2 respectively. The magnetic member 12 also acts as a magnetic shield and enables the head to be used in environments of high magnetic fields without affecting the magnetic signals on the associated magnetic medium. Also the member 12 is effective to prevent cross-talk between adjacent heads.

In a constructed embodiment of the invention, for example, the parameters of the head were adjusted so that the amplitude of the output signal $E_0$ had a value of the order of 3.0 volts in the absence of an extraneous magnetic field representing, for example, a logical "1" recorded on the associated magnetic medium; and the output voltage $E_0$ had a value of the order of 0.3 volts in the presence of a magnetic field due, for example, to a logical "0" being recorded on the associated magnetic medium.

The amplitude of the output voltage $E_0$ may be controlled by increasing or decreasing the drive current flowing in the winding N1. The amplitude of the output signal $E_0$ is independent of the relative velocity between the head and the magnetic medium, and the Farraday law does not apply.

Figure 5:
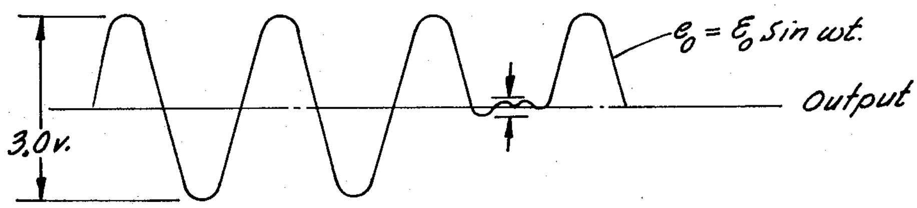
FIG. 5 is a wave form showing the output signal derived from the head structure.

As shown in FIG. 5, the output signal $E_0$ is symmetrical when logical "0" or logical "1" is sensed on the associated recording medium. Through a magnetic cancellation process, to be described, the output signal drops from its value of the order of 3.0 volts, for example, to a value of the order of 0.3 volts, while still maintaining its symmetrical characteristics, in the presence of a magnetic field induced through its tip 10*a* corresponding, for example, to a logical "0" bit on the associated magnetic medium.

Figure 3:
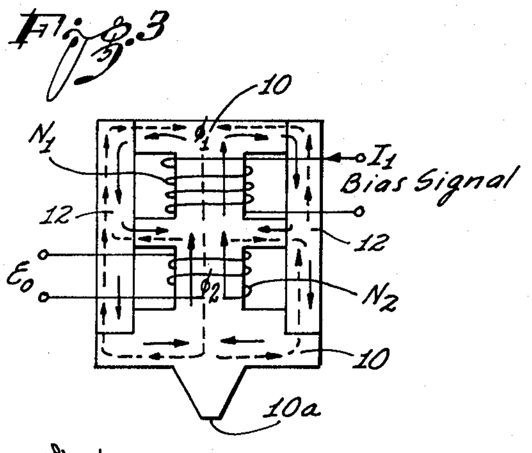
FIG. 3 is a schematic representation showing the magnetic field established within the core structure of the head of FIG. 1.

As shown in the schematic representation of FIG. 3, a field flux $\phi_1$ is generated in the core 10 by the bias or drive current signal $I_1$ in the drive winding N1. For the interval of $0-\pi$ in FIG. 4, the flux $\phi_1$ has a first direction as represented by the doted lines and arrows, and for the second interval $\pi-2\pi$, the flux $\phi_1$ has a reverse direction as represented by the solid lines and arrows.

In the absence of any external flux, the flux $\phi_2$ linking the winding N2 produces the full amplitude signal $E_0$ across the winding N2. However, an extraneous field sensed by the core tip 10*a*, and indicating the presence of logical "0" on the associated magnetic medium, causes flux to flow into the core 10 through the tip 10*a*.

This latter flux flows up the center leg of the core and cancels the $\phi_2$ flux in the center leg when the $\phi_1$ flux is in the direction of the dotted lines, for example, The extraneously induced flux also flows up through the outer magnetic member 12 and in a direction to cancel the $\phi_2$ flux when the $\phi_1$ flux is in the direction of the solid lines. Symmetrical cancellation is thereby achieved for the duration of the external flux which results in the symmetrical reduction in amplitude of $E_{01}$ as shown in FIG. 5.

It will be appreciated that the static head illustrated in FIGS. 1 and 2 utilizes a field cancelling technique, as explained in the preceding paragraph in conjunction with the diagram of FIG. 3. This technique permits static or dynamic sensing the head, and the amplitude of the output signal ($E_0$) is not affected by the relative velocity between the head and the magnetic medium. As also mentioned above, the usual prior art type of static gating head relies on a change in magnetic reluctance, and is therefore predicated on a different operating principle than the head of the present invention.

A constructed embodiment of the head is capable of reading 9,300 counts per revolution in a single track size 23 encoder disc.

While a particular embodiment of the invention has been shown and described, modifications may be made, and it is intended in the following claims to cover all such modifications which come within the spirit and scope of the invention.

What is claimed is:

1. A magnetic sense head for sensing magnetic recordings on a magnetic medium, said head comprising: a flat unitary core structure composed of a laminate of magnetic permeable material, said laminate being shaped to define an apex at one extremity thereof and said extremity being in magnetic coupled relationship with the magnetic medium; a read-write winding wound about said laminate displaced axially therealong from said apex; a drive winding wound about said laminate displaced axially from said read-write winding and responsive to an alternating current drive signal to create a magnetic flux in said core linking said read-write winding so as to induce an output voltage in said read-write winding; a member composed of magnetic permeable material extending around said laminate and around said read-write winding and said drive winding to provide a return magnetic path for the head, said magnetic flux in said core created by said drive winding being effected by the magnetic recordings on said magnetic medium thereby causing the amplitude of the output voltage in said read-write winding to be controlled by such magnetic recordings.

2. The magnetic sense head defined in claim 1, in which said laminate has recesses therein for receiving said read-write winding and said drive winding.

* * * * *